(12) United States Patent
Sims et al.

(10) Patent No.: US 6,708,921 B2
(45) Date of Patent: *Mar. 23, 2004

(54) COMPOSITE FLAPPING FLEXURE

(75) Inventors: John L. Sims, Hurst, TX (US); Patrick R. Tisdale, Roanoke, TX (US); Ernie A. Powell, Bedford, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/120,279

(22) Filed: Apr. 10, 2002

(65) Prior Publication Data

US 2002/0153450 A1 Oct. 24, 2002

Related U.S. Application Data

(60) Provisional application No. 60/285,255, filed on Apr. 20, 2001.

(51) Int. Cl.[7] ................................................. B64C 27/33
(52) U.S. Cl. ..................................... 244/17.11; 244/7 A
(58) Field of Search ........................... 244/17.11, 7 A, 244/10, 17.21, 17.27, 19, 20, 21, 22, 70, 75 A, 133; 428/608

(56) References Cited

U.S. PATENT DOCUMENTS

| | | | | |
|---|---|---|---|---|
| 4,427,340 A | * | 1/1984 | Metzger et al. | 416/141 |
| 4,741,943 A | | 5/1988 | Hunt | 428/113 |
| 5,358,381 A | * | 10/1994 | Covington et al. | 416/134 A |
| 5,496,002 A | | 3/1996 | Schutze | 244/123 |
| 5,755,558 A | | 5/1998 | Reinfelder et al. | 416/230 |
| 6,375,426 B1 | * | 4/2002 | Brack et al. | 416/134 A |
| 2002/0153450 A1 | * | 10/2002 | Sims et al. | 244/17.11 |

* cited by examiner

*Primary Examiner*—Charles T. Jordan
*Assistant Examiner*—Stephen A Holzen
(74) *Attorney, Agent, or Firm*—James E. Walton

(57) ABSTRACT

A composite flapping flexure is disclosed in which load carrying belts are located on the upper and lower surfaces of the flexure, and minor load carrying off-axis layers are located at the mid-plane of the flexure.

17 Claims, 6 Drawing Sheets

Test Results of 44" Flapping Flexures ← 401

| | Flexure Config. | Applied Loads | | Initial Failure Cycles | Stop Failure Cycles | % Uni in Flexure |
|---|---|---|---|---|---|---|
| | | CF | Rotation | | | |
| 403 | Fig. 2 | 27530 lb | 7° | No Failure 10,000,000 | No Failure 10,000,000 | 78 |
| 405 | Fig. 2 | 27530 lb | 8° | 4,692,000 | 4,692,000 | 78 |
| 407 | Fig. 1 (Prior Art) | 27530 lb | 7° | 356,210 | 411,918 | 78 |

COMPOSITE FLAPPING FLEXURE

This application claims the benefit of U.S. Provisional Application No. 60/285,255, filed Apr. 20, 2001, titled "Optimized Belt Stacking in Composite Flapping Flexure."

BACKGROUND

1. Field of the Invention

The present invention relates to composite flapping flexures. In particular, the present invention relates to the belt stacking sequences in composite flapping flexures.

2. Description of Related Art

In simple terms, flapping is the oscillatory perpendicular movement of a rotor blade relative to the rotor plane in a helicopter or other rotor craft. As those skilled in the art are aware, flapping in rotor blades is necessary to resolve the problem of dissimilarity of rotor thrust. A typical rotor will flap above and below the rotor plane through a total angle of flexure of about 7°.

For many years, composite materials have been used in the aircraft industry to form parts that are lighter and stronger than their metallic counterparts. Composite materials generally consist of a fiber material, such as fiberglass, suspended in a matrix material, such as an epoxy resin. Helicopter designers employ such composite materials to form rotor yokes that can counteract the cyclic out-of-plane bending loads generated by rotor flapping.

Currently, these composite flapping flexures are manufactured from composite laminates having layers that alternate between load carrying layers and minor load carrying layers. In the load carrying layers, also referred to as "belts," the fiberglass fibers of the composite material are generally aligned with the longitudinal axis of the flexure. In the minor load carrying layers, also referred to as "off-axis layers," the fiberglass fibers are oriented at selected angles to the longitudinal axis of the flexure, such as ±45°.

Due to fiber orientation, the off-axis layers are softer in bending than the belts. When the flexure is subjected to an out-of-plane bending load, shear strains are generated between the off-axis layers and the belts, the maximum shear strain being at the mid-plane of the flexure. As a result, mid-plane delamination is the predominant failure mode for composite flapping flexures. Because these composite flapping flexures are exposed to cyclic bending, failure can result either from the flexure exceeding a certain maximum flapping angle, or from fatigue due to the cyclic nature of the bending loads.

Although great strides have been made in the design of composite flapping flexures, there is a need for a composite flapping flexure that is more flexible and that has a longer fatigue life.

SUMMARY OF THE INVENTION

There is a need for a composite flapping flexure having an increased maximum angle of flexure and an increased fatigue life.

Therefore, it is an object of the present invention to provide a composite flapping flexure having a belt stacking arrangement that increases the maximum angle of flexure and increases the fatigue life of the flexure.

The above objects are achieved by providing a composite flapping flexure in which the load carrying belts are located on the upper and lower surfaces of the flexure, and the non-load carrying off-axis layers are located at the mid-plane of the flexure.

The composite flapping flexure of the present invention provides significant advantages. With a composite flapping flexure according to the present invention, the maximum angle of flexure can be increased and fatigue capability can be improved.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figures 1, 6:
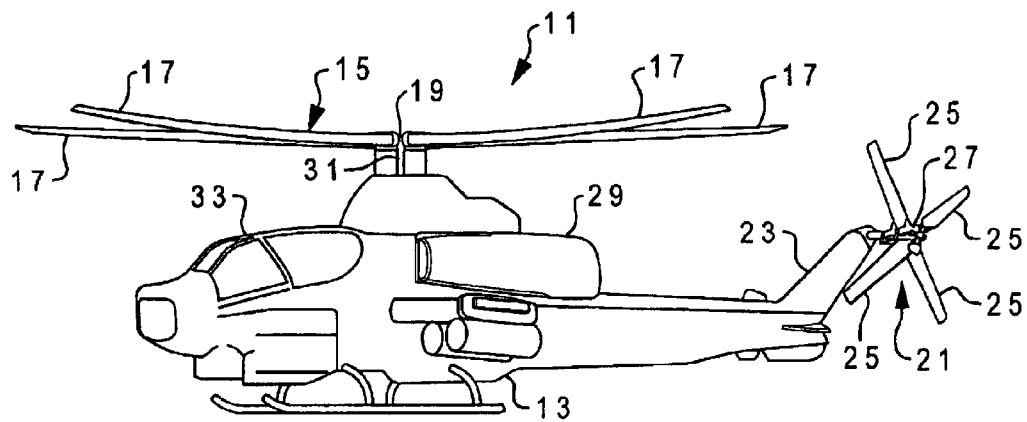
FIG. 1 is an isometric view of a helicopter having a composite flapping flexure according to the present invention.
FIG. 6 is a tabular representation of the results of a test comparison of the prior-art composite flapping flexure of FIG. 1 to the composite flapping flexure according to the present invention of FIG. 2.

Referring to FIG. 1 in the drawings, an aircraft 11 having a composite flapping flexure according to the present invention is illustrated. Aircraft 11 comprises a fuselage 13 and a main rotor 15. Main rotor 15 includes rotor blades 17 that are coupled to a pair of stacked rotor yokes 19. Torque imparted to fuselage 13 by main rotor 15 is counteracted by a tail rotor 21 carried by a tail portion 23 of fuselage 13. Tail rotor 21 includes tail rotor blades 25 and a tail rotor hub 27. Main rotor 15 is powered by a drive means 29 via a drive mast 31 under the control of a pilot in a cockpit 33.

Figure 2:
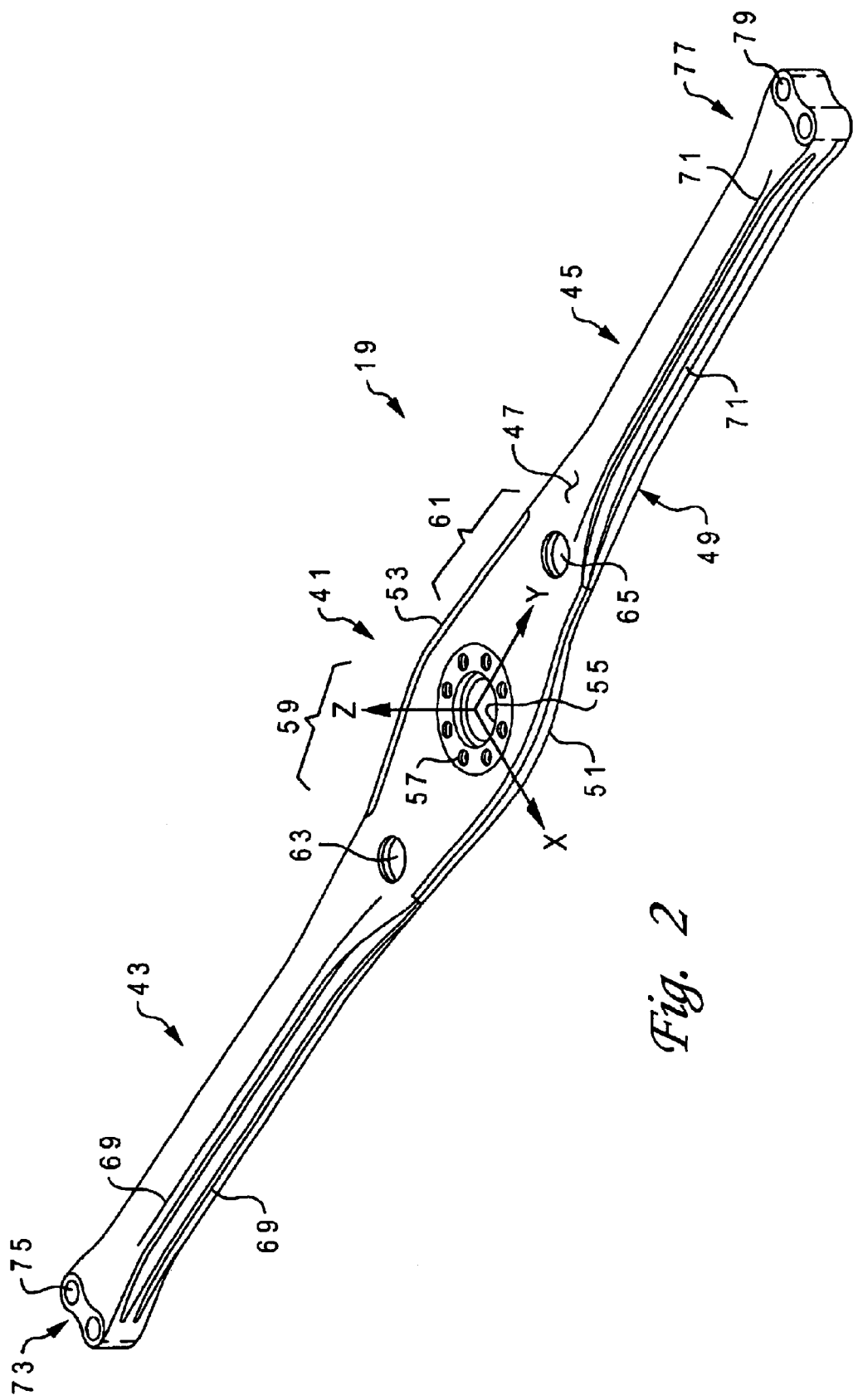
FIG. 2 is an isometric view of a composite flapping flexure according to the present invention used in a rotor yoke application.

Referring now to FIG. 2 in the drawings, one of the rotor yokes 19 is illustrated in a perspective view. Yoke 19 incorporates composite flapping flexures 59 and 61 according to the present invention. Because the composite flapping flexure according to the present invention is particularly suited for a helicopter main rotor yoke, the present invention will be described herein with reference to such an application. However, it should be understood that the composite flapping flexure of the present invention may be utilized in a wide variety of applications.

Yoke 19 is an elongated member having a center section 41 and two integral arm sections 43 and 45 that extend outwardly in opposite directions from center section 41. Yoke 19 will be described herein with reference to orthogonal axes X, Y, and Z, with the Y axis being the longitudinal axis of yoke 19. Yoke 19 is of laminar construction, preferably being made of a plurality of layers of composite materials, as will be described in detail below. The composite materials that form yoke 19 are layered one upon another, generally in the X-Y plane, and then cured in a conventional manner. Yoke 19 includes an upper surface 47 and a lower surface 49. After yoke 19 has been laid up and cured, yoke 19 is trimmed to size by conventional means. Other post-cure finishing and machining may be necessary.

Yoke 19 is left with laminated edge surfaces generally parallel to the Z axis that are exposed. These exposed edge surfaces are susceptible to various problems, such as mid-plane delamination that initiates on the exposed edge surface due to edge effect concentrations and that progresses toward the center of the composite flexure as the composite flexure is cyclically loaded; random impact damage, such as from handling; and the uptake moisture in high humidity environments. To alleviate these problems, protective edge members 51 and 53 are added to the exposed edges of yoke 19. The functions and operation edge members 51 and 53 are described in detail in U.S. patent application Ser. No. 09/407,691, which has been allowed, and which is incorporated herein by reference as if set forth in full.

Center section 41 of yoke 19 preferably curves outward in the ±X directions and is thicker in the ±Z directions, thereby providing added volume and strength in center section 41. A mast aperture 55 is located at the center of center section 41. Mast aperture 55 receives drive mast 31. Drive mast 31 is adapted to be coupled to yoke 19 by conventional fastening means, such as bolts (not shown), that pass through a plurality of bolt apertures 57 that are arranged around mast aperture 55. Bolt apertures 57 also provide a means for the second rotor yoke to be coupled to yoke 19.

As center section 41 transitions into arm sections 43 and 45, yoke 19 tapers inwardly in two directions, X and Z, forming transition regions, referred to herein as flexure regions 59 and 61. Flexure regions 59 and 61 experience a significant amount of out-of-plane bending, or flapping, forces and motions. Flexure regions 59 and 61 transition into arm sections 43 and 45. An aperture 63 passes through yoke 19 along the Z axis at a point where flexure region 59 transitions into arm section 43. Likewise, an aperture 65 passes through yoke 19 along the Z axis at a point where flexure region 61 transitions into arm section 45. Apertures 63 and 65 are adapted and configured to receive conventional elastomeric shear restraint bearings (not shown). It should be understood that apertures 63 and 65 may vary in size, shape, arrangement, number, and location dependent upon the particular shear restraint bearing system employed. Such variations would have no appreciable effect on the functionality of the present invention.

Continuing with reference to FIG. 2 in the drawings, arm sections 43 and 45 extend outward in opposite directions along the Y axis from flexure regions 59 and 61, respectively. Arm section 43 may include a plurality of flanges and curvatures 69. In a symmetrical fashion, arm section 45 may include a plurality of flanges and curvatures 71. The shape and dimensions of flanges and curvatures 69 and 71 are predetermined to allow arm sections 43 and 45 to twist in torsion to accommodate the feathering, or pitch, motions generated by variable pitch rotor blades 17.

Arm section 43 terminates with an end portion 73 having apertures 75 configured to receive a sleeve member (not shown) that covers the connection of a first rotor blade 17 to yoke 19. In an identical fashion, arm section 45 terminates with an end portion 77 having apertures 79 configured to receive a sleeve member (not shown) that covers the connection of a second rotor blade 17 to yoke 19. The length, thicknesses, and cross-sectional profiles of yoke 19 are chosen such that yoke 19 possesses certain selected mechanical properties in selected sections of yoke 19. As such, yoke 19 is capable of withstanding the centrifugal, feathering, flapping, lead-lag, and other static and dynamic forces and motions generated by rotor blades 17.

Feathering forces and motions are torsional pitch forces and motions generated by the variable pitch of rotor blades 17; flapping forces and motions are bending forces and motions generated by out-of-plane motion of rotor blades 17; and lead-lag forces and motions are bending forces and motions generated by in-plane motion of rotor blades 17. By accommodating the centrifugal, feathering, flapping, lead-lag, and other static and dynamic forces and motions generated by rotor blades 17 solely by selectively determining the length, thicknesses, and cross-sectional profiles of yoke 19, there is no need for bearings. In other words, yoke 19 may serve as a bearingless helicopter main rotor yoke.

Figure 3:
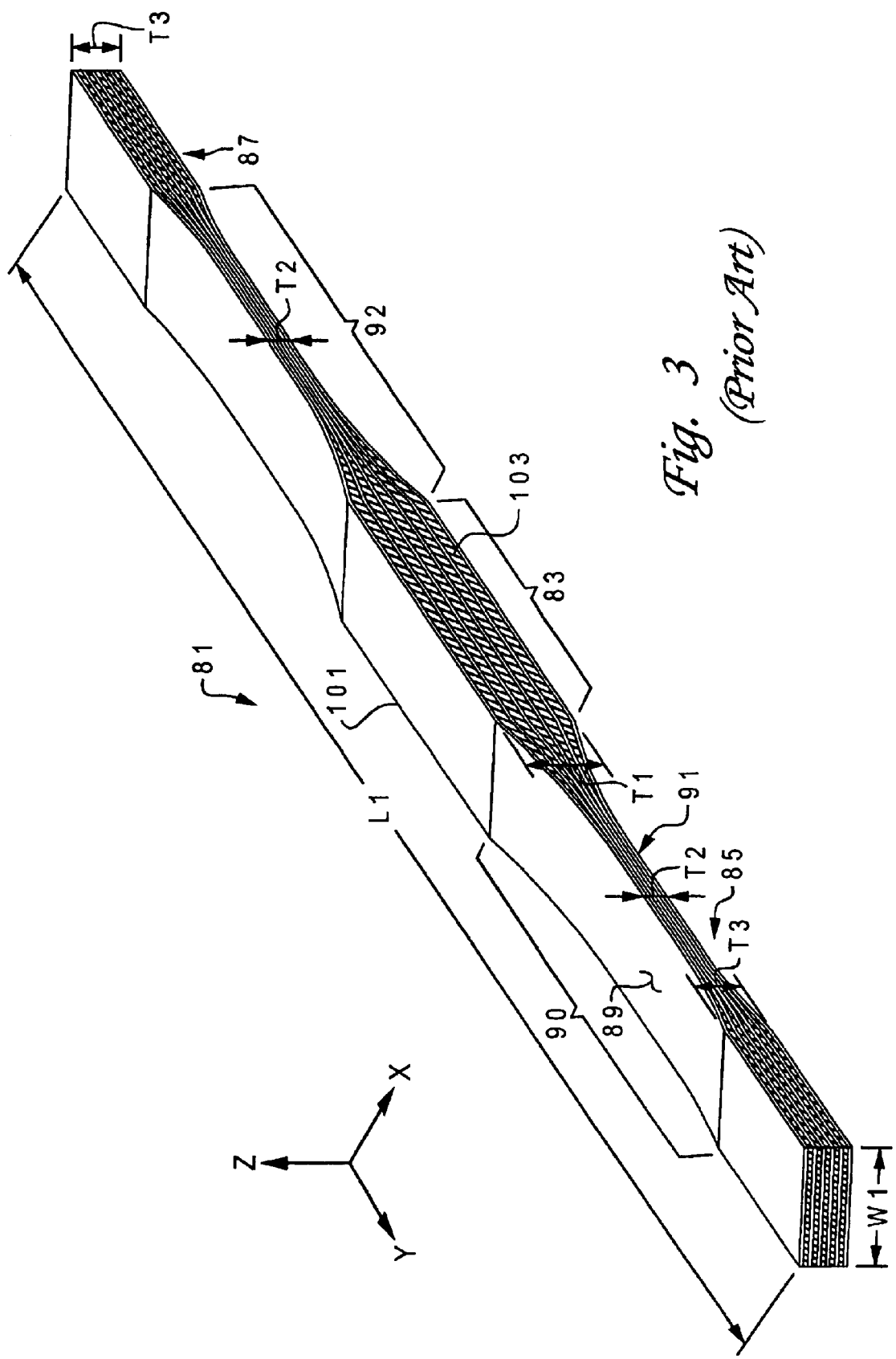
FIG. 3 is an isometric view of a composite flapping flexure test element showing the stacking sequence of a prior art composite flapping flexure.

Referring now to FIG. 3 in the drawings, a schematic showing the stacking sequence of a prior-art composite flapping flexure 81 is illustrated. Prior-art flexure 81 will be described herein with reference to orthogonal axes X, Y, and Z, with the Y axis being the longitudinal axis of flexure 81. Flexure 81 is an elongated member having a center section 83 and two integral arm sections 85 and 87 that extend outwardly in opposite directions along the Y axis from center section 83. Flexure regions 90 and 92 are formed at the longitudinal mid-points of arm sections 85 and 87, respectively, and taper inwardly in the Z direction. Flexure 81 typically has a length L1 of about forty-four inches, and a width W1 of about four inches. The thickness of flexure 81 in the Z direction varies along the length of flexure 81. For example, flexure 81 may have a thickness T1 of about 1.25 inches at center section 83, a thickness T2 of about 0.375 inches at the midpoints of flexure regions 90 and 92, and a thickness T3 of about 0.75 inches at the ends of arm sections 85 and 87.

Flexure 81 is of laminar construction, preferably being made of a plurality of layers of composite materials. The composite materials that form flexure 81 are layered one upon another, generally in the X-Y plane, and then cured in a conventional manner. Flexure 81 includes an upper surface 89 and a lower surface 91. After flexure 81 has been laid up and cured, flexure 81 is trimmed to size by conventional means. Other post-cure finishing and machining may be necessary, such as the addition of mounting apertures and protective edge members (not shown, but similar to edge members 51 and 53), some of which may require a second curing process.

As mentioned above, prior-art composite flapping flexures, such as flexure 81, are manufactured from composite laminates having layers that alternate between load carrying layers and non-load carrying layers. In the load carrying layers, also referred to as "belts," the fiberglass fibers of the composite material are generally aligned with the longitudinal axis of the flexure, i.e., oriented at 0° to the longitudinal axis. In the non-load carrying layers, also referred to "off-axis layers," the fiberglass fibers are oriented at selected angles to the longitudinal axis of the flexure, such as at ±45°. In FIG. 3, a plurality of belts 101 are shown in a light color, and a plurality of off-axis layers 103 are shown in a dark color. As is shown, flexure 81 is arranged from alternating layers of belts 101 and off-axis layers 103, such that upper surface 89 and lower surface 91 are formed from belts 101, and off-axis layers 103 and additional belts 101 are evenly spaced along the Z direction throughout the interior of flexure 81. In flexure regions 90 and 92, belts 103 typically form about 78% of thickness T2.

Due to fiber orientation, off-axis layers 103 are softer in bending than belts 101. When flexure 81 is subjected to an out-of-plane bending load, shear strains are generated between off-axis layers 103 and belts 101, the maximum shear strain being at the mid-plane in the Z direction of flexure 81. As a result, delamination initiates on the mid-plane, this mid-plane delamination being the predominant failure mode of flexure 81. Because flexure 81 is exposed to cyclic bending, failure can result either from flexure 81 exceeding a certain maximum flexure angle about the X axis, or from fatigue due to the cyclic nature of the bending loads.

Figure 4:
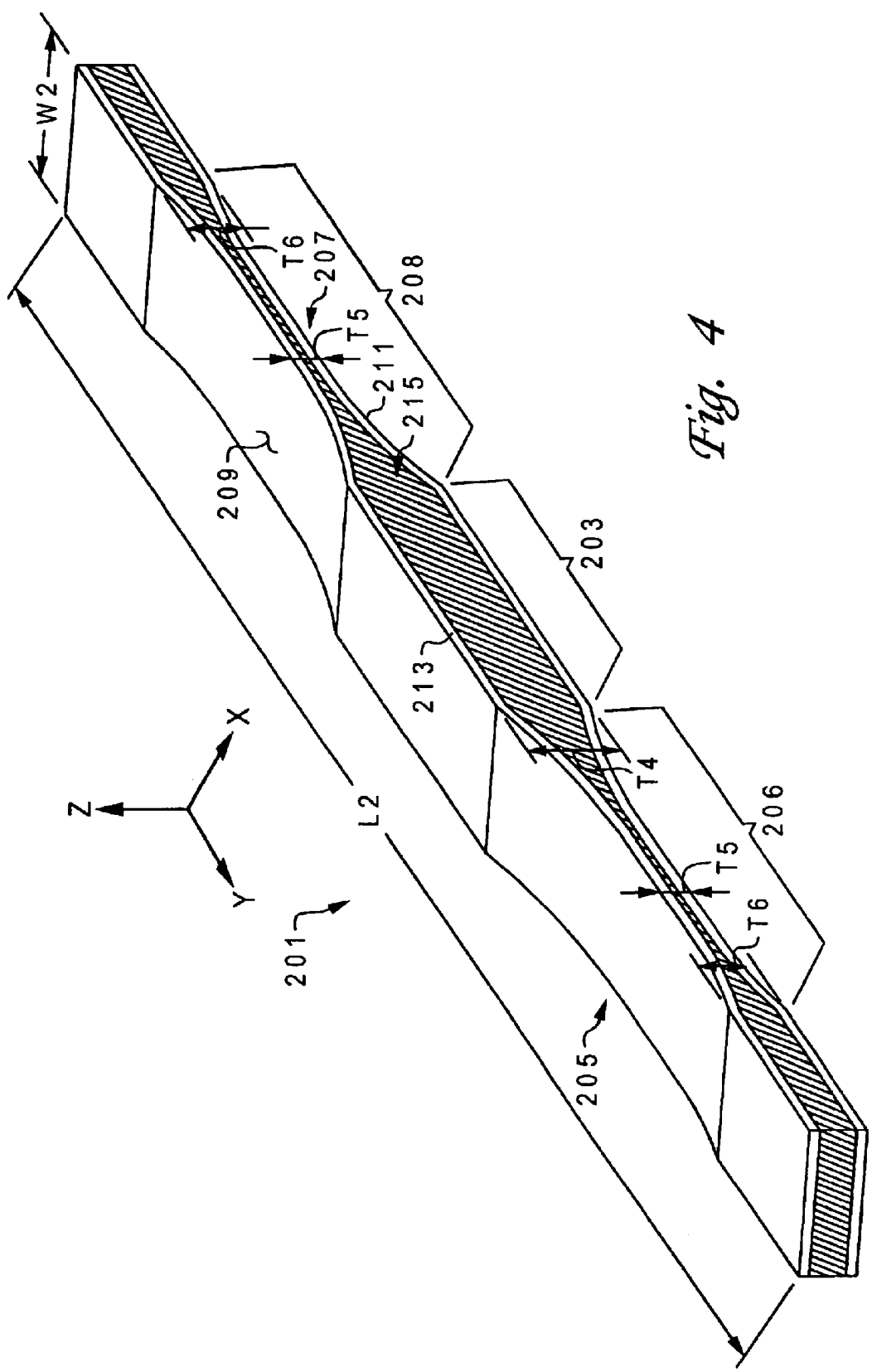
FIG. 4 is an isometric view of a composite flapping flexure test element showing the stacking sequence of the preferred embodiment of the composite flapping flexure of the present invention.

Referring now to FIG. 4 in the drawings, a schematic showing the preferred stacking sequence of a composite flapping flexure 201 according to the present invention is illustrated. Flexure 201 will be described herein with reference to orthogonal axes X, Y, and Z, with the Y axis being the longitudinal axis. Flexure 201 is an elongated member having a center section 203 and two integral arm sections 205 and 207 that extend outwardly in opposite directions along the Y axis from center section 203. Flexure regions 206 and 208 are formed at the longitudinal mid-points of arm sections 205 and 207, respectively, and taper inwardly in the Z direction. Flexure 201 preferably has a length L2 of about forty-four inches, and a width W2 of about four inches. The thickness of flexure 201 in the Z direction varies along the length of flexure 201. For example, flexure 201 may have a thickness T4 of about 1.25 inches at center section 203, a thickness T5 of about 0.375 inches at flexure regions 206 and 208, and a thickness T6 of about 0.75 inches at the ends of arm sections 205 and 207.

Flexure 201 is of laminar construction, preferably being made of a plurality of layers of composite materials. The composite materials that form flexure 201 are layered one upon another, generally in the X-Y plane, and then cured in a conventional manner. Flexure 201 includes an upper surface 209 and a lower surface 211. After flexure 201 has been laid up and cured, flexure 201 is trimmed to size by conventional means. Other post-cure finishing and machining may be performed, such as the addition of mounting apertures and protective edge members (not shown, but similar to edge members 51 and 53), some of which may require a second curing process.

Flexure 201 is manufactured from composite laminates, but is different from prior-art flexure 81 in that load carrying layers, or belts 213, are preferably disposed only at upper surface 209 and lower surface 211 of flexure 201; and the layers of off-axis material, or off-axis layers 215, are preferably disposed in the interior of flexure 201. In FIG. 4, belts 213 are shown in a light color, and off-axis layers 215 are shown in a dark color. In belts 213, the fiberglass fibers of the composite material are generally aligned with the longitudinal axis of flexure 201, i.e., at 0° to the longitudinal axis. In off-axis layers 215, the fiberglass fibers are oriented at selected angles to the longitudinal axis of the flexure, preferably at ±45°. In flexure regions 206 and 208, belts 213 typically form about 78% of thickness T5. In the preferred embodiment, belts 213 and off-axis layers 215 are manufactured from fiberglass fibers in an epoxy resin having the designation S2/E773. It should be understood that other composite materials, combinations of S2/E773 and other composite materials, and combinations of completely different composite materials may be used for flexure 201, depending upon particular applications and the particular flexure characteristics desired.

Just as in prior-art flexure 81, due to fiber orientation, off-axis layers 215 are softer in bending than belts 213; and the maximum shear load occurs at the mid-plane of flexure 201 when flexure 201 experiences bending loads about the X axis. However, because the interfaces between belts 213 and off-axis layers 215 are located very near upper surface 209 and lower surface 211, when flexure 201 is subjected to such out-of-plane bending loads, the shear strains generated between off-axis layers 215 and belts 213 are significantly lower and do not lead to mid-plane delamination. Because the only layers present at the mid-plane of flexure 201 are off-axis layers 215, mid-plane delamination is delayed and flexure 201 does not fail under normal bending loads. In addition, flexure 201 can sustain a higher maximum flexure angle without failing.

Figure 5:
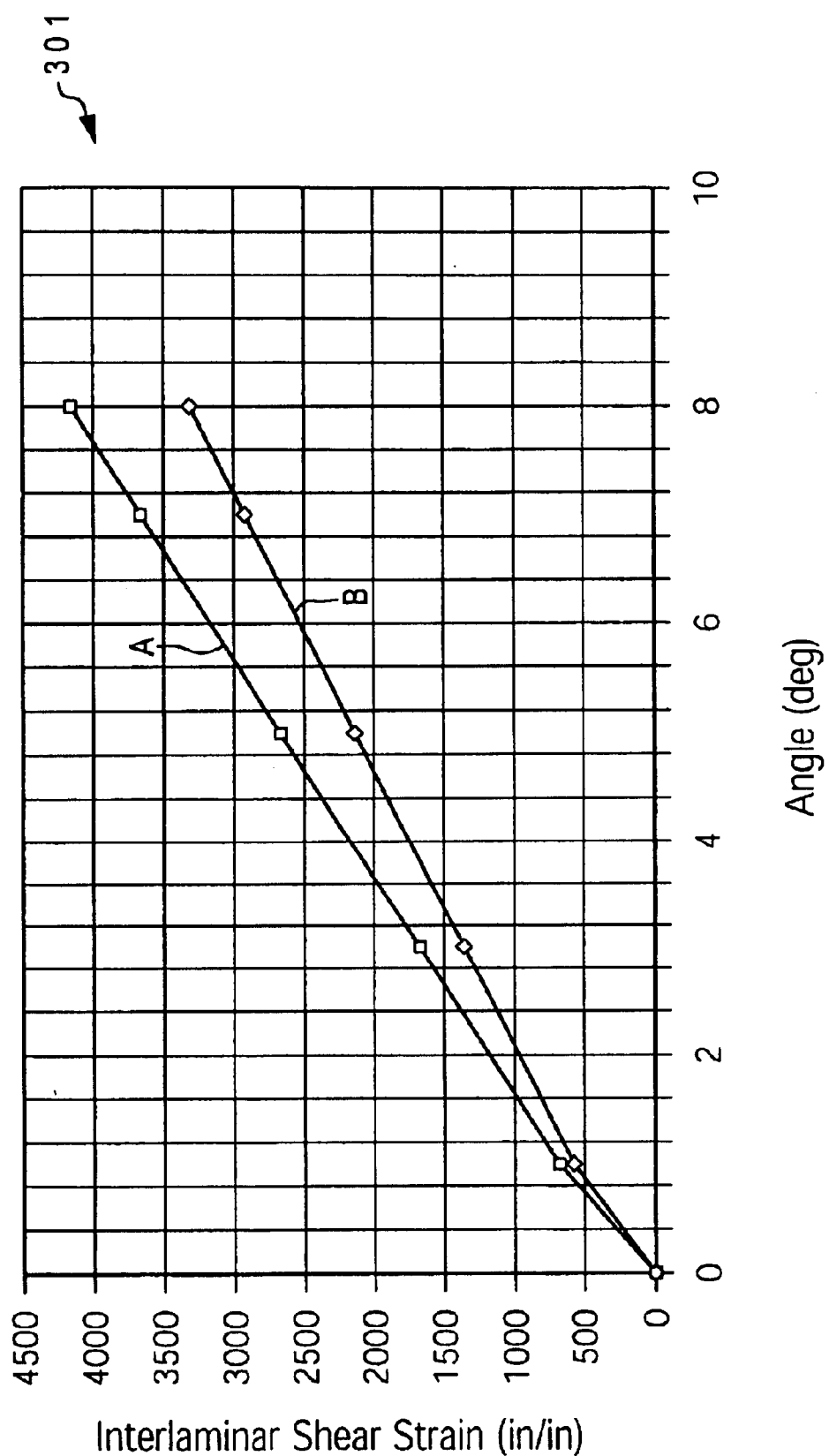
FIG. 5 is computer generated graph of interlaminar shear strain versus flexure angle for the prior-art composite flapping flexure of FIG. 1 and the composite flapping flexure according to the present invention of FIG. 2.

Referring now to FIG. 5 in the drawings, a computer generated graph 301 based upon a finite element analysis of prior-art composite flapping flexure 81 and composite flapping flexure 201 according to the present invention is illustrated. Curve A is a plot of the interlaminar shear strain versus flexure angle for prior-art composite flapping flexure 81 of FIG. 3, and curve B is a plot of the interlaminar shear strain versus flexure angle for composite flapping flexure 201 of FIG. 4. As can be seen, the interlaminar shear strain is higher in flexure 81 for all flexure angles. The higher the interlaminar shear strain, the higher the chance of delamination failure, particularly if the shear strain is located near the mid-plane of the flexure where the shear loads are maximized. These computer generated results are confirmed by actual test results.

Referring now to FIG. 6 in the drawings, a tabular representation of actual test results from a comparison of prior-art flexure 81 to flexure 201 according to the present invention is illustrated. A table 401 includes a row for each of three specimen flexures tested. A row 403 represents test results for a flexure according to the present invention, such as flexure 201, experiencing 27,530 pounds of centrifugal force at a maximum flexure angle of 7°. Next, a row 405 represents test results for a flexure according to the present invention, such as flexure 201, experiencing 27,530 pounds of centrifugal force at a maximum flexure angle of 8°. Finally, a row 407 represents test results for a prior-art flexure, such as flexure 81, experiencing 27,530 pounds of centrifugal force at a maximum flexure angle of 7°. In these tests, the belts form about 78% of the thickness of the flexure region of each flexure. All of the specimens in the test included protective edge members similar to edge members 51 and 53.

As is shown, the prior-art flexure in row 407 experienced an initial mid-plane delamination failure at 356,210 cycles, and experienced a stop failure at 411,918 cycles. On the other hand, the flexure according to the present invention of row 403 did not experience either an initial failure or a stop failure in 10,000,000 cycles; and, when subjected to a heightened maximum flexure angle of 8°, the flexure according to the present invention of row 405 was able to withstand 4,692,000 cycles before an initial failure, which was also a stop failure. These results indicate that the composite flapping flexure according to the present invention provides significantly greater performance without adding any additional weight or material. Thus, by merely concentrating the load carrying belts at the upper and lower surfaces of the flexure, fatigue failure can be improved, and the maximum flexure angle can be significantly increased.

Figure 7:
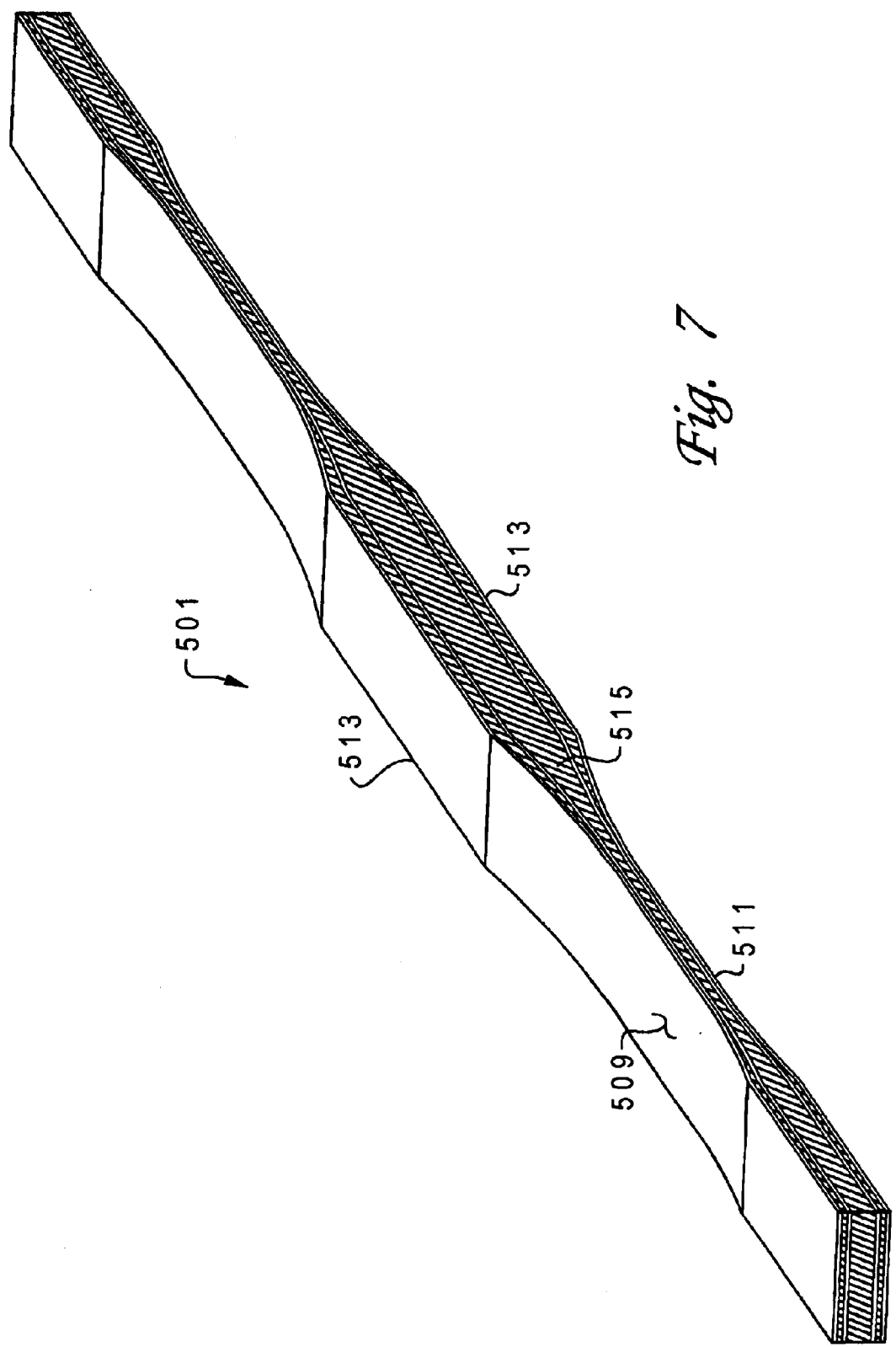
FIG. 7 is an isometric view of a composite flapping flexure test element showing the stacking sequence of an alternate embodiment of the composite flapping flexure of the present invention.

Referring now to FIG. 7 in the drawings, a schematic of an alternate embodiment of the present invention is illustrated. In this embodiment, a composite flapping flexure 501 has an alternate stacking sequence. Flexure 501 is identical in form and function to flexure 201, in that belts 513 are preferably disposed at an upper surface 509 and lower surface 511 of flexure 501; and the layers of off-axis material, or off-axis layers 515, are preferably disposed in the interior of flexure 501; but with the exception that a small number of belts 511 are disposed near the mid-plane of flexure 501 for added strength. In FIG. 7, belts 513 are shown in a light color, and off-axis layers 215 are shown in a dark color.

It is apparent that an invention with significant advantages has been described and illustrated. Although the present invention is shown in a limited number of forms, it is not limited to just these forms, but is amenable to various changes and modifications without departing from the spirit thereof.

We claim:

1. A composite flexure for accommodating flapping forces generated by helicopter rotor blades, the composite flexure comprising:

an elongated portion having an upper surface, a lower surface, and a longitudinal axis, the elongated portion being adapted for coupling to the rotor blades;

a plurality of laminated composite belts having composite fibers that are oriented along the longitudinal axis, the belts extending along the elongated portion and being disposed only at the upper surface and the lower surface; and a plurality of laminated composite off-axis layers having composite fibers that are oriented at selected angles to the longitudinal axis, the off-axis layers extending along the elongated portion and being disposed between the belts;

wherein the mid-plane delamination durability of the composite flexure is increased.

2. The composite flexure according to claim 1, wherein the laminated composite belts and the laminated composite off-axis layers are all formed from fiberglass fibers in an epoxy resin.

3. The composite flexure according to claim 1, wherein the laminated composite belts and the laminated composite off-axis layers are all formed from fiberglass fibers in an epoxy resin having a designation S2/E773.

4. The composite flexure according to claim 1, wherein the off-axis layers are oriented at ±45° relative to the longitudinal axis.

5. The composite flexure according to claim 1, further comprising:

a flexure region in each end of the elongated portion, each flexure region having a reduced thickness in a direction perpendicular to the plane of the belts, the reduction in thickness being from a reduction in the number of off-axis layers only.

6. The composite flexure according to claim 1, further comprising:

protective edge members disposed along exposed lateral edges of the elongated portion.

7. A helicopter comprising:

a fuselage;

a drive means carried by the fuselage for actuating a drive mast;

a rotor yoke coupled to the drive mast; and a plurality of rotor blades coupled to the rotor yoke(s);

wherein the rotor yoke comprises:

an elongated member having an upper surface, a lower surface, a flexure region at each end, and a longitudinal axis;

a plurality of laminated composite belts having composite fibers that are oriented along the longitudinal axis, the belts extending along the elongated member and being disposed only at the upper surface and the lower surface; and a plurality of laminated composite off-axis layers having composite fibers that are oriented at selected angles to the longitudinal axis, the off-axis layers extending along the elongated member and being disposed between the belts;

wherein flapping forces generated by the rotor blades are accommodated by the flexure regions; and wherein the mid-plane delamination durability of the composite flexure is increased.

8. The helicopter according to claim 7, wherein the laminated composite belts and the laminated composite off-axis layers are all formed from fiberglass fibers in an epoxy resin.

9. The helicopter according to claim 7, wherein the laminated composite belts and the laminated composite off-axis layers are all formed from fiberglass fibers in an epoxy resin having a designation S2/E773.

10. The helicopter according to claim 7, wherein the off-axis layers are oriented at ±45° relative to the longitudinal axis.

11. The helicopter according to claim 7, wherein each flexure region has a reduced thickness in a direction perpendicular to the plane of the belts, the reduction in thickness being from a reduction in the number of off-axis layers only.

12. The helicopter according to claim 7, further comprising:

protective edge members disposed along exposed lateral edges of the elongated member.

13. A method of accommodating flapping forces in a helicopter rotor system, the method comprising the steps of:

providing a helicopter having a fuselage and a drive means carried by the fuselage for actuating a drive mast;

forming an elongated rotor yoke having an upper surface, a lower surface, a flexure region at each end, and a longitudinal axis, the formation of the rotor yoke comprising the steps of:

forming the upper and lower surfaces from a plurality of laminated composite belts having composite fibers that are oriented along the longitudinal axis; and disposing a plurality of laminated composite off-axis layers having composite fibers that are oriented at selected angles to the longitudinal axis between the belts; and forming the flexure regions by selectively reducing the thickness of the rotor yoke in a direction perpendicular to the plane of the belts, the reduction in thickness being from a reduction in the number of off-axis layers only; coupling the rotor yoke to the drive mast;

coupling a plurality of rotor blades to the rotor yoke; and accommodating flapping forces generated by the rotor blades with the flexure regions such that the mid-Diane delamination durability of the rotor yoke is increased.

14. The method according to claim 13, wherein the laminated composite belts and the laminated composite off-axis layers are all formed from fiberglass fibers in an epoxy resin.

15. The method according to claim 13, wherein the laminated composite belts and the laminated composite off-axis layers are all formed from fiberglass fibers in an epoxy resin having a designation S2/E773.

16. The method according to claim 13, wherein the off-axis layers are oriented at ±45° relative to the longitudinal axis.

17. A method to help prevent mid-plane delamination in a composite flapping flexure in a helicopter rotor system, the method comprising the steps of:

providing a helicopter having a fuselage and a drive means carried by the fuselage for actuating a drive mast;

forming an elongated rotor yoke having an upper surface, a lower surface, a flexure region at each end, and a longitudinal axis, the formation of the rotor yoke comprising the steps of:

forming the upper and lower surfaces from a plurality of laminated composite belts having composite fibers that are oriented along the longitudinal axis; and disposing a plurality of laminated composite off-axis layers having composite fibers that are oriented at selected angles to the longitudinal axis between the belts; and forming the flexure regions by selectively reducing the thickness of the rotor yoke in a direction perpendicular to the plane of the belts, the reduction in thickness being from a reduction in the number of off-axis layers only;

coupling the rotor yoke to the drive shaft; and coupling a plurality of rotor blades to the rotor yokes;

wherein the mid-plane delamination durability of the rotor yoke is increased.

* * * * *